Patented Oct. 28, 1941

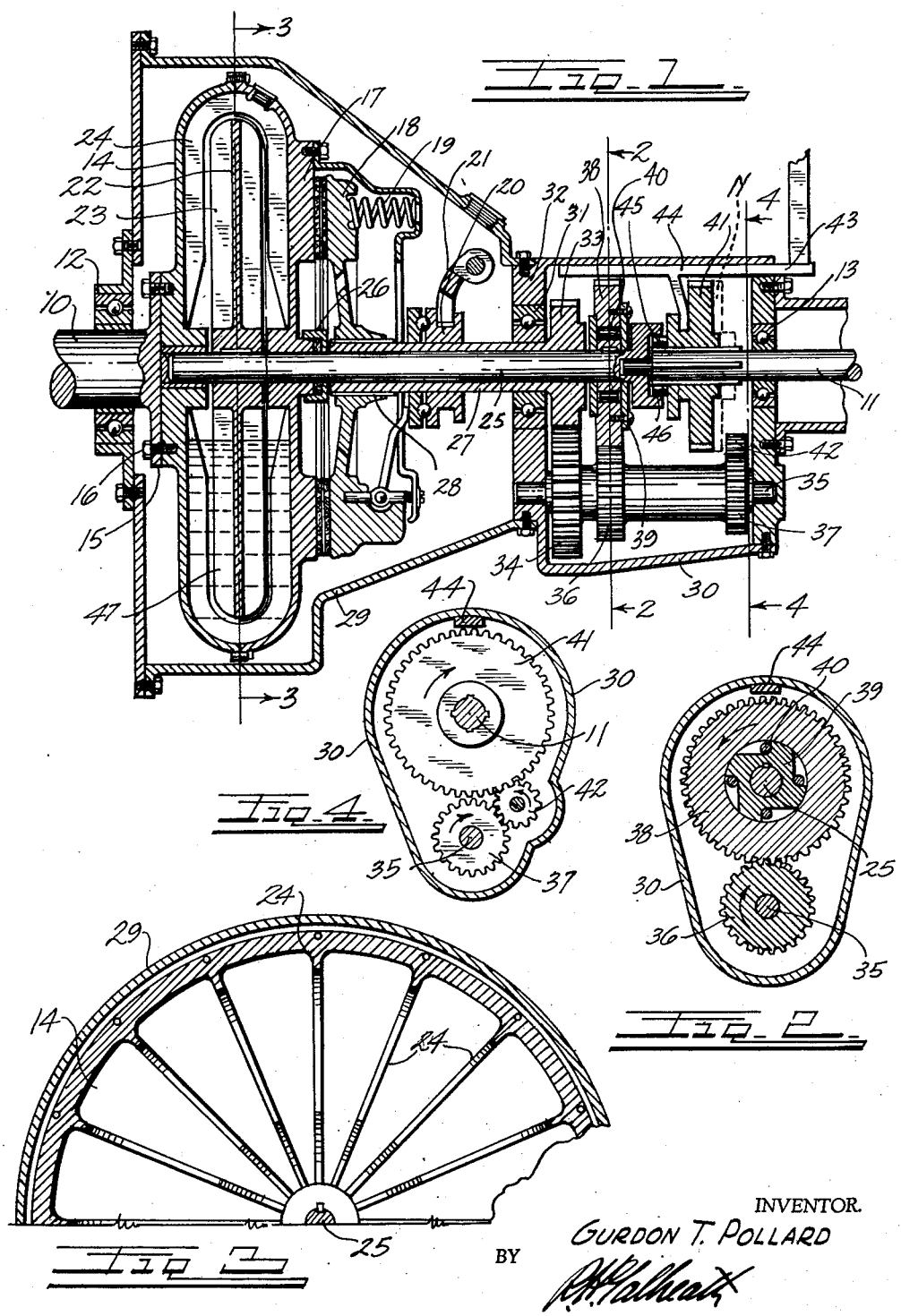

2,260,581

UNITED STATES PATENT OFFICE 2,260,581

FLUID TRANSMISSION

Gurdon T. Pollard, Denver, Colo.

Application June 15, 1940, Serial No. 340,740

2 Claims. (Cl. 74—189.5)

This invention relates to a power transmission device of the type employing fluid as the transmission medium. It is more particularly intended for use on automotive vehicles but is not limited to this particular use since it will be found valuable wherever it is desired to transmit power at varying speeds and at varying torque ratios.

The principal object of this invention is to provide a simplified fluid transmission device which will eliminate the high speed racing of the engine now necessary with fluid transmissions used for slow speed, heavy duty work.

In the usual fluid automotive transmission, if a heavy load is being drawn or a steep hill is encountered, it is necessary to race the engine at relatively high speeds in order to obtain sufficient fluid densities to carry the load. This invention is so designed that when the load reaches a point when a low gear ratio is necessary, the device will automatically place a mechanical pre-set low gear transmission in operation to replace the fluid transmission until the load decreases to a point where the low pre-set mechanical gear ratio is no longer required, at which time the fluid will resume the transmission of the power.

Another object of the invention is to so construct the device that all required ratios between the pre-set mechanical low and the direct connected or high speed position will be automatically accommodated by the fluid portion of the transmission.

A still further object is to provide a combined fluid and mechanical transmission device in which the mechanical position may be easily placed out of service so that a complete automatic fluid transmission may be had at all ratios, or a combined automatic fluid and mechanical transmission may be had as desired by the operator or required by road or traffic conditions.

Another object of the invention resides in the fluid transmission, per se, which is designed so as to obtain equal pressure on both faces and peripheral edge of the rotor so as to eliminate all side thrusts, and to obtain a maximum effect from the centrifugal action at the periphery.

Further objects are: to construct a device of this character with a minimum number of parts; to reduce weight to a minimum; to reduce friction; and to simplify and increase the efficiency of the art of fluid transmission devices.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a longitudinal section through the improved transmission device.

Figs. 2 and 3 are cross sections therethrough, taken on the lines 2—2 and 3—3, Fig. 1, respectively.

Fig. 4 is a cross section through the field housing illustrating the construction of the inner walls thereof. This section is taken at the line 4—4, Fig. 1.

In the drawing, a drive shaft from which the power to be transmitted is received is indicated at 10 and a driven shaft to which the power is to be transmitted is indicated at 11. In an automotive vehicle, the shaft 10 would probably be the crank shaft of the engine and the shaft 11 would be the propellor shaft extending to the differential gears on the drive axle. Supporting bearings for the drive shaft are illustrated at 12 and bearings for the driven shaft at 13.

A rotary fluid housing 14, partially filled with fluid 47, is secured to the drive shaft 10 in any suitable manner, such as through the medium of a shaft flange 15 and flange bolts 16. The housing 14 is originally formed in two halves which may be secured together after assembly in any desired manner, such as by bolts, screws, or they may be welded to form a complete unitary, circular fluid housing.

The rear face of the housing 14 is provided with an annular clutching surface 17 with which a friction clutch 18 coacts. The clutch may be of any of the usual standard designs and its detail construction forms no part of the present invention. As illustrated, it is a typical friction clutch of the type to be forced into the engaged position by means of suitable clutch springs 19 and to be withdrawn from the engaged position by means of a yoke ring 20 actuated from a clutch yoke 21 as is usual in automotive clutch designs.

Within the housing 14 is a disc-like rotor 22. The rotor is provided on both of its faces with a plurality of radial vanes 23. The housing 14 is likewise provided with a plurality of radial vanes 24 on both its inner surfaces extending completely around the periphery of the rotor 22. The rotor is keyed or otherwise secured on a transmission shaft 25 which is axially journalled in the housing 14 and sealed thereto by means of a suitable packing gland 26. A tubular shaft 27 rotatably surrounds the transmission shaft 25 and the clutch member 18 is splined, as indicated at 28, on this tubular shaft.

The entire structure as thus far described is enclosed in a suitable clutch housing 29 from which a transmission housing 30 extends. The shafts 25 and 27 are journalled in a suitable bearing 31 in a partition plate 32 between the housings 29 and 30.

The tubular shaft 27 terminates in a drive gear 33 which is constantly in mesh with a relatively larger counter-shaft gear 34 carried on a countershaft 35. The countershaft also carries a low speed gear 36 and a reverse gear 37. The latter is always in mesh with a reverse idler gear 42. A directional clutch gear 38 is carried on the transmission shaft 25. This gear surrounds a directional clutch ratchet member 39 which is keyed or otherwise secured to the shaft 25. The member 39 is tangentially notched to receive ratchet rollers 40 which act against the interior of the gear 38 to transmit power in one direction thereto. The ratchet member 39 is so directed that the gear 38 will transmit power to the shaft 25 unless the shaft is rotated faster than the gear. When the latter occurs the latchet rollers 40 will release the gear 38 and allow the speed of the shaft 25 to increase to any desired speed.

The drive shaft 11 is provided with a splined shift gear 41 which can be shifted into mesh with the reverse idler gear 42 by operation of suitable shift rod 43 and yoke 44. The forward face of the gear 41 is provided with clutch dogs 45 which can be brought into engagement with a toothed receiving socket 46 on the extremity of the shaft 25.

Thus, when the gear 41 is shifted to its complete forward position, as illustrated in Fig. 1, the shafts 25 and 11 will be directly connected. When shifted to its extreme rearward position, the shaft 11 will be connected through the reverse idler 42 to the countershaft 35 so as to rotate in a reverse direction from the rotation of the tubular shaft 27. When shifted to an intermediate position, such as indicated in broken line in Fig. 1, the shaft 11 will be completely disconnected from the transmission.

*Operation*

The invention provides two paths for the power. A "mechanical path" through the clutch member 18, tubular shaft 27, gears 33, 34, 36, and ratchet member 39 to the transmission shaft, and a "fluid path" through the fluid in the housing to the rotor 22 and directly to the transmission shaft 25. The power flow automatically chooses the path best adapted to the load conditions present.

Let us assume that the device is installed in an automobile and that the gear 41 is in its forward position directly connected to the shaft 25; that the clutch 18 is in a disengaged or "out" position and that the engine is slowly rotating the shaft 10 and the housing 14. The slow rotation of the engine acting through the fluid 47 does not transmit sufficient power to the shaft 11 to rotate the latter under load. The shaft 11 may be started in either of two ways. It may be done by leaving the clutch in the "out" position and accelerating the speed of the engine to cause the centrifugal action to pack the fluid 47 about the periphery of the housing 14 thus causing the whirling fluid to transmit power to the rotor 22 and thence directly to the shaft 11. As the car picks up speed and the load decreases, the speed of the rotor 22 will approach the speed of the housing 14 and the car will gradually assume a substantially direct connected or high speed position with very little lost motion or slip The above method of starting is satisfactory for all ordinary operations. No actuation of the clutch is necessary. The preferred method of starting however is to allow the clutch member 18 to slowly engage. This requires less engine speed and immediately places the car in the preset mechanical low gear ratio without requiring excessive engine speed to obtain fluid transmission. The power flows directly to the ratchet gear 38 and through the ratchet to the shaft 25. As the car picks up speed and the starting load decreases the speed of the rotor 22, and of the transmission shaft 25, increases until the ratchet member 39 is overriding the gear 38. The speed of the shaft 25 continues to increase until it assumes the substantially "direct connected" or high speed relation.

From the instant that the speed of the shaft 25, and shaft 11, exceeds the speed of the gear 38 the ratchet rollers are automatically released and the car is driven as a straight fluid drive. Assuming that the engine speed is held constant the speed of the driven shaft increases as the load is decreased and decreases as the load increases. Additional torque and speed are obtained as the engine speed increases.

Should the car encounter a hill, the load on the driven shaft will increase and the speed of the shaft 25 will decrease. Should the speed of the driven shaft decrease until it endeavors to rotate slower than the positive forward speed of the gear 38, the ratchet rollers will engage and the shaft will be positively driven through the "mechanical path" of the gears. As soon as the load decreases sufficiently the "fluid path" will take over the work and the gears will simply idle until again required. Thus the two paths automatically relieve each other as conditions require and all excessive engine speeds for "low gear" work are eliminated.

The operation of reversing is strictly mechanical and is accomplished by declutching and shifting the gear 41 rearwardly. This disconnects the fluid rotor from the driven shaft (to prevent reversal thereof) and connects the driven shaft with the positively driven reverse idler gear 42. At all other times the clutch dogs 45 are engaged in the socket 46. An idling or neutral position is provided however at "N," Fig. 1 for completely disconnecting the driven shaft to facilitate engine starting towing etc.

It will be noted that should the built-in mechanical low ratio be not sufficiently low for extremely heavy work, the clutch member 18 may be disengaged to allow the engine to be raced to obtain a still lower ratio through the fluid.

While a specific form of the improvements has been described and illustrated herein, it is desired to be understood that the same may be varied, within the scope of the appended claims, without departing from the spirit of the invention.

Having thus described the invention, what is claimed and desired secured by Letters Patent is:

1. A power transmission device comprising: a drive shaft; a fluid coupling having an outer and an inner element, the outer element being mounted on and rotated by said drive shaft; a transmission shaft secured to and extending from the inner element of said coupling; a tubular shaft surrounding the transmission shaft exteriorly of said coupling; a clutching surface secured to said outer element; a clutch for engaging said surface secured to said tubular shaft; a drive gear mounted on and secured to said tubular shaft; a directional clutch gear mounted on and free to revolve in a rearward direction only about said transmission shaft; a driven shaft in axial alignment with said transmission shaft; a countershaft positioned parallel to the axis of said shafts; a countershaft gear secured on said countershaft in constant mesh with said drive gear; a relatively smaller low speed gear secured on said countershaft in constant mesh with said directional clutch gear; a reverse gear secured on said countershaft; a reverse idler gear in constant mesh with said reverse gear; and shiftable means on said driven shaft for connecting the latter either with the reverse idler gear or with the transmission shaft as desired.

2. A power transmission device comprising: a drive shaft; a fluid coupling having an outer and an inner element, the outer element being mounted on and rotated by said drive shaft; a transmission shaft secured to and extending from the inner element of said coupling; a tubular shaft surrounding the transmission shaft exteriorly of said coupling; a clutching surface secured to said outer element; a clutch for engaging said surface secured to said tubular shaft; a drive gear mounted on and secured to said tubular shaft; a directional clutch gear mounted on and free to revolve in a rearward direction only about said transmission shaft; a driven shaft in axial alignment with said transmission shaft; a countershaft positioned parallel to the axis of said shafts; a countershaft gear secured on said countershaft in constant mesh with said drive gear; a relatively smaller low speed gear secured on said countershaft in constant mesh with said directional clutch gear; a reverse gear secured on said countershaft; a reverse idler gear in constant mesh with said reverse gear; a shiftable gear splined on said driven shaft so that it may be brought in and out of mesh with said reverse idler gear; and clutching means actuated in consequence of the shifting of said shiftable gear to clutch the driven shaft to the transmission shaft when the shiftable gear is out of mesh with said reverse idler gear.

GURDON T. POLLARD.